United States Patent [19]

Goch et al.

[11] Patent Number: 5,706,720

[45] Date of Patent: Jan. 13, 1998

[54] AIR/LIQUID REGULATOR USED IN FROZEN DESSERT DISPENSING MACHINES

[75] Inventors: Bernard J. Goch, Elkhart Lake; Theodore J. Salkowski, Grafton, both of Wis.

[73] Assignee: Stoelting, Inc.

[21] Appl. No.: 740,661

[22] Filed: Oct. 31, 1996

[51] Int. Cl.⁶ .............................. B01F 7/16; B01F 15/02; A23G 9/00; A23G 9/20

[52] U.S. Cl. ........................ 99/455; 62/342; 62/354; 99/460; 366/149; 366/204

[58] Field of Search ........................ 99/452, 453–455, 99/517, 459–466; 62/342, 343, 306, 308, 127, 136, 233, 354; 137/512, 536; 241/101.8; 366/144–149, 286, 261, 276, 320, 325.3, 204, 152.1, 195, 196

[56] References Cited

U.S. PATENT DOCUMENTS

| | | |
|---|---|---|
| 3,304,737 | 2/1967 | Strutynski . |
| 3,695,051 | 10/1972 | Hunt ........................ 366/204 X |
| 3,866,801 | 2/1975 | Stapleton . |
| 3,898,858 | 8/1975 | Erickson . |
| 3,930,535 | 1/1976 | Menzel . |
| 3,945,614 | 3/1976 | Suzuki et al. ............... 366/149 X |
| 3,958,968 | 5/1976 | Hosaka ..................... 62/343 |
| 3,977,656 | 8/1976 | Faivre ...................... 366/282 |
| 3,979,172 | 9/1976 | Sogo et al. ................ 366/156.2 X |
| 4,179,904 | 12/1979 | McClenny ................... 62/342 |
| 4,212,547 | 7/1980 | Thomson .................... 366/325.3 |
| 4,221,117 | 9/1980 | Martineau . |
| 4,232,051 | 11/1980 | Hinds, Jr. et al. ........... 99/459 X |
| 4,429,549 | 2/1984 | Randolphi .................. 366/149 X |
| 4,617,802 | 10/1986 | Fiedler ..................... 62/308 X |
| 4,741,174 | 5/1988 | Uesaka ..................... 62/342 |
| 4,831,839 | 5/1989 | Anderson et al. . |
| 4,890,928 | 1/1990 | McDonald ................... 366/163.1 X |
| 5,072,599 | 12/1991 | Simone . |
| 5,095,710 | 3/1992 | Black et al. . |
| 5,246,175 | 9/1993 | Feldpausch ................. 99/455 |

*Primary Examiner*—Timothy F. Simone
*Attorney, Agent, or Firm*—Whyte Hirschboeck Dudek S.C.

[57] ABSTRACT

An air/liquid mix regulator is disclosed for use in a frozen confectionary dessert dispensing machine. The mix regulator regulates the amount of liquid and air entering the freezing chamber of the frozen dessert machine. The regulator has a single aerator tube having both an air inlet passage and a liquid inlet passage which are least partially divided. The aerator tube has different liquid inlet openings at each end so that it is invertible and usable with differing liquid viscosities. The aerator tube is engageable with a base section of the regulator and has a check valve therein to prevent the backflow of aerated mix into the storage chamber to prevent frothing and foaming in the storage hopper. The single check valve is located in an area of the base section that takes advantage of the relatively warmer liquid in the storage hopper to prevent freezing and sticking of the check valve. The regulator has a twist-lock feature to prevent self-ejection when the check valve is closed and a pressure differential occurs between the freezing chamber and the storage hopper. The regulator provides self priming, prevents freeze-ups, disassembles easily for cleaning, is able to feed a wide viscosity range of mix, and maintains a stable desired overrun for producing a dispensed product with consistent, desired serveability, while increasing profits of the vendor.

27 Claims, 4 Drawing Sheets

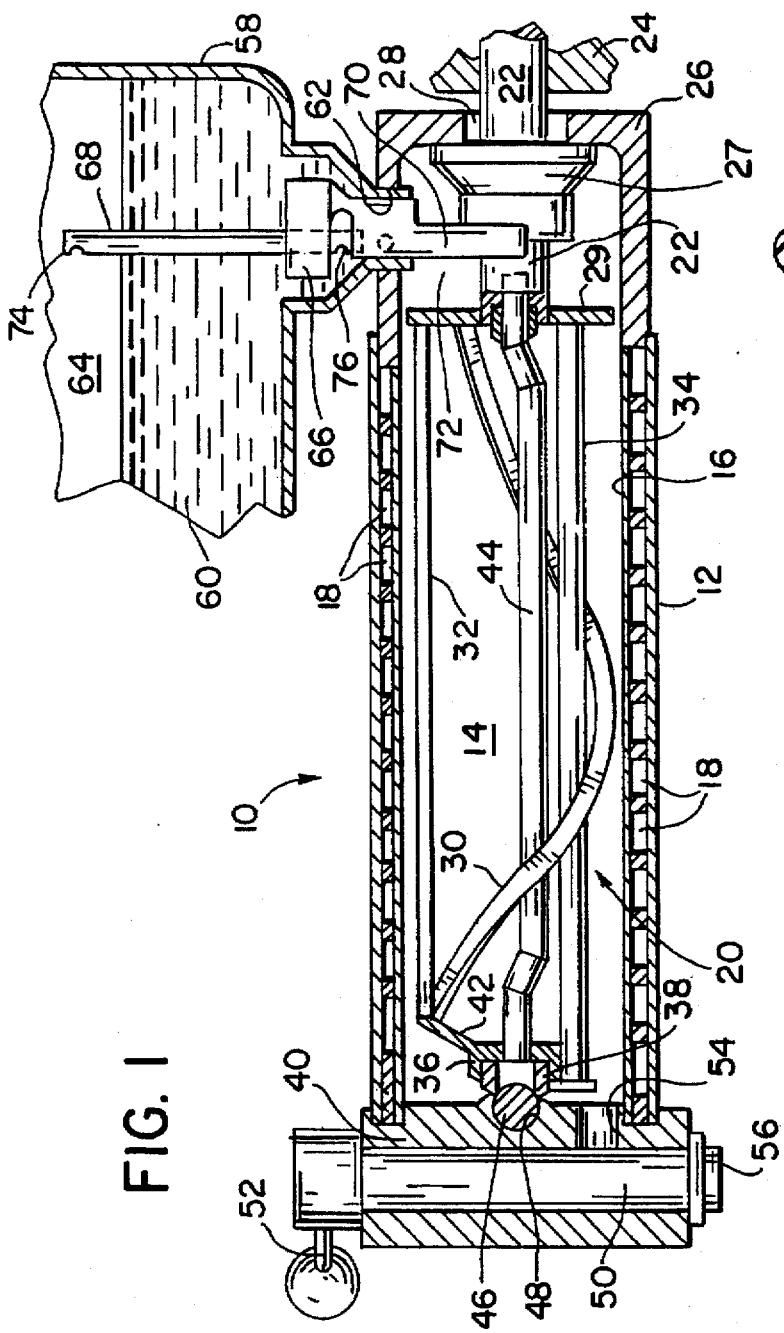
FIG. 1
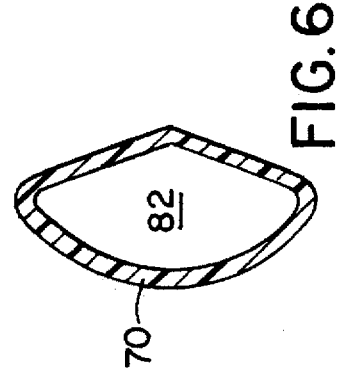
FIG. 6
FIG. 5
FIG. 4

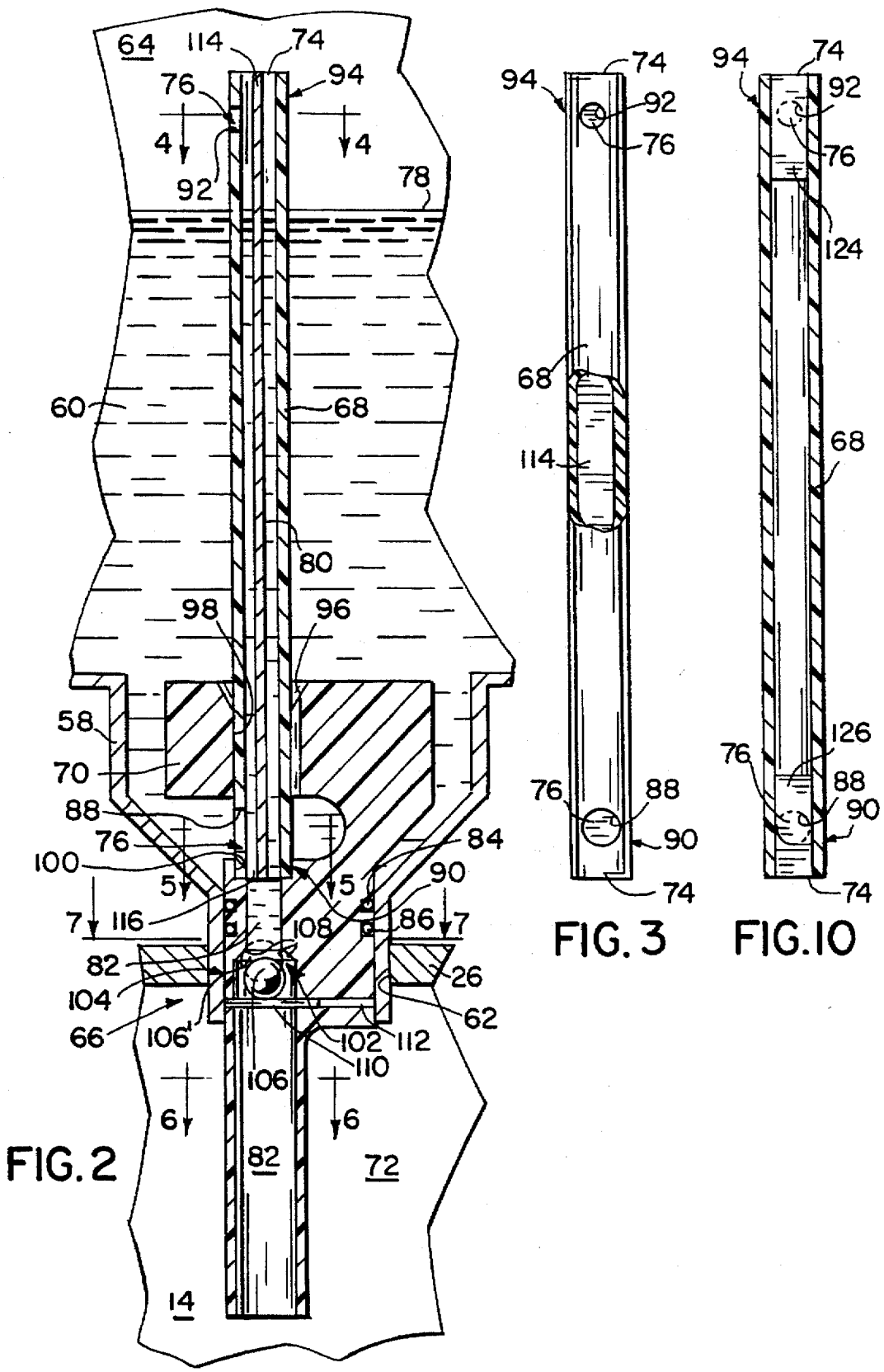

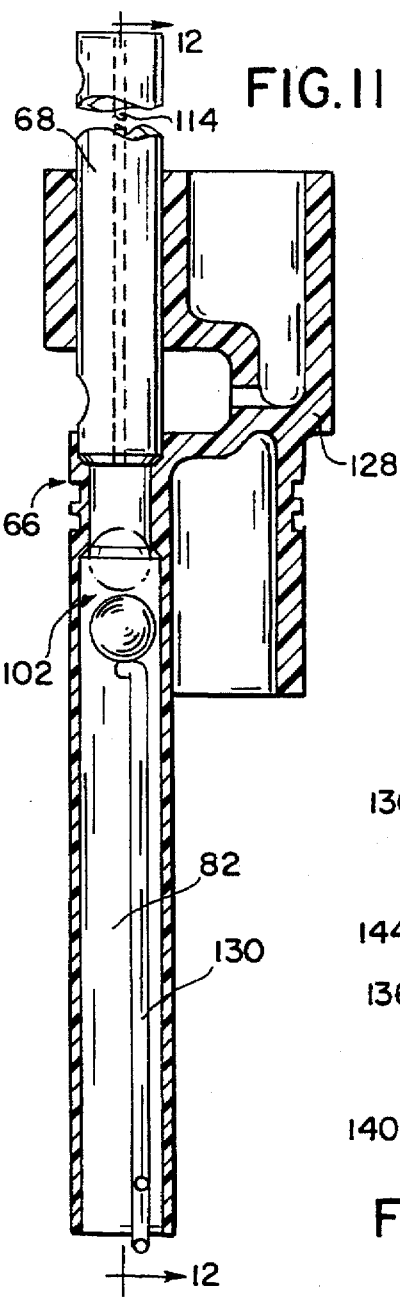
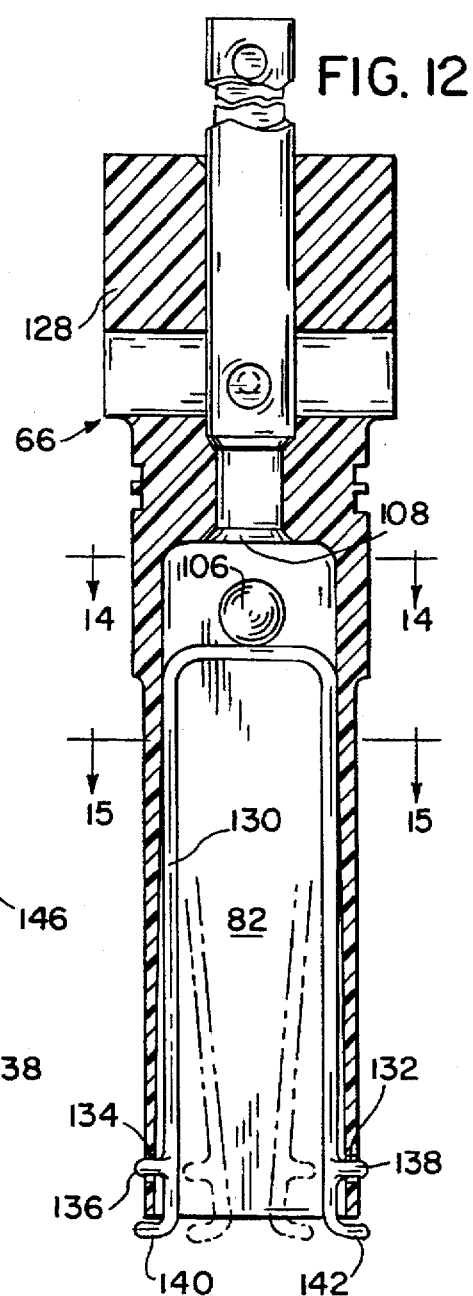
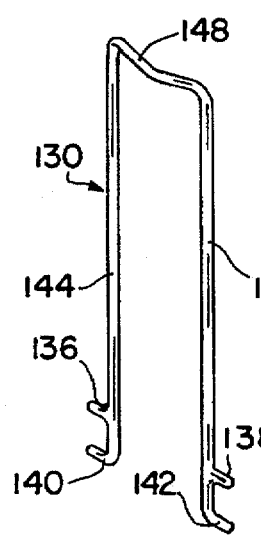
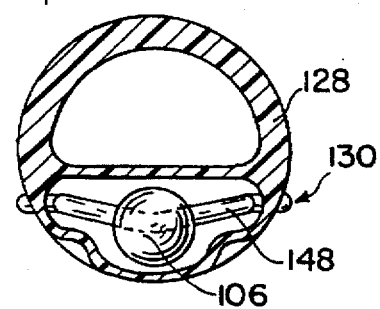
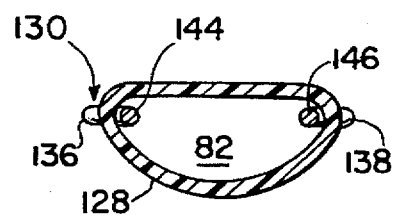

AIR/LIQUID REGULATOR USED IN FROZEN DESSERT DISPENSING MACHINES

BACKGROUND OF THE INVENTION

The present relates generally to air and liquid flow control in a frozen dessert machine, and more particularly to an air/liquid regulator or proportioner used in a frozen dessert dispensing machine to better regulate the introduction of air and liquid into the freezing chamber of the dispensing machine, thereby providing more efficient operation of the machine while at the same time producing a more consistent, high quality product.

Such air and liquid flow controls in frozen dessert dispensing machines are commonly referred to aerators, carburetors, mix inlet regulators, and estrangulation valves. However, all are intended to do the same function of metering the quantity of air and liquid intake into the freezing chamber. It is understood that the term regulator used hereinafter incorporates all the above terms.

Frozen dessert dispensing machines are used to dispense soft confectionary products such as aerated ice cream, custard, milk shakes, frozen yogurt, sherbets, sorbets, or other similar partially frozen dessert products. Most of these dispensing machines are designed similarly and operate in a similar manner. A storage hopper or reservoir is positioned above a freezing chamber and holds the liquid form of the desired dessert product. Air and liquid are drawn into the freezing chamber where they are mixed and cooled to form the aerated frozen product that is commonly referred to as a "soft-serve" frozen dessert.

The proportion of air and liquid introduced into the freezing chamber is critical in obtaining a product with desired consistency and in maximizing the profits of the vender. In other words, if too much liquid and too little air is introduced into the freezing chamber, the dispensing machine must run for long periods to properly freeze the product, and the dispensed product may be grainy in texture, lack proper taste, and not stand up properly on a cone or in a cup because the product lacks proper aeration. Further, the efficiency of the machine is reduced because more liquid than air is being dispensed, resulting in the vendors profits decreasing.

There have been many attempts at properly regulating the amounts of air and liquid entering the freezing chamber in the prior art, but most have fallen short in at least one of a number of categories. For example, in those that do not use some form of a check valve, at times a pressure differential will occur between the freezing chamber and the storage hopper causing aerated mixture to backfill into the storage hopper. This results in a layer of froth, or foam, on top of the liquid which is not only unsanitary, but also results in erroneous measurements when attempting to measure the temperature of the liquid. That is, when an inspector inserts a thermometer into the liquid and a layer of froth or foam is present on top of the liquid, the thermometer may only partially enter the liquid, or in some cases not enter the liquid at all. Since the froth or foam is highly aerated, it is at a much higher temperature than the liquid, resulting in failure of the inspection.

There have been prior art attempts at correcting this problem by inserting a check valve in the regulator which has had some success. However, it has been found that some other problems occasionally occur. For example, there is a good potential for the regulator to "self eject" from the storage hopper when a pressure differential occurs between the freezing chamber and storage hopper. Also, because of the low temperatures in the freezing chamber, the check valve tends to freeze up causing too little liquid from enter the freezing chamber, and in some cases completely blocking the introduction of air and liquid. Once this condition occurs, the machine must be drained, cleaned, and refilled resulting in costly down time and wasted product.

Another problem experienced by prior art regulators is inconsistent serving consistency of the dispensed product that results from changes in the quantities of air and liquid drawn into the freezing chamber. The previously described problem of having too much liquid is commonly referred to as the loss of "overrun." Overrun is defined as the weight of liquid less the weight of aerated mixture, divided by the weight of aerated mixture. Multiplying the result by 100, will provide the overrun percentage. It has been found that a 50% to 60% overrun range is typically desirable. A stable overrun not only provides consistent quality of dispensed product to increase serveability, but also maximizes the profit of the vendor.

It is generally understood that in order to dispense a wide range of products from a single frozen dessert dispensing machine, the regulator must be changed to accommodate the viscosity of the liquid to be mixed and dispensed, or a specialized variable inlet regulator must be provided which requires adjustment by the operator. For example, thick, viscous custards require a larger opening than the relatively thin, low viscosity sherbets and sorbets that are high in water content and low in fat content.

Therefore, it would be desirable to have an air/liquid regulator in a frozen dessert dispensing machine that solves all these problems without greatly increasing the cost of the dispensing machine.

SUMMARY OF THE INVENTION

The present invention provides an air/liquid regulator for use between a liquid storage hopper and a freezing chamber of a frozen dessert dispensing machine that overcomes the aforementioned problems, and does not greatly increase the overall cost of the dispensing machine.

In accordance with one aspect of the invention, an air/liquid regulator having an aerator tube and a base section is disclosed, wherein the aerator tube has an air inlet at a top end and a liquid inlet at a lower end. The base section engages the storage hopper and extends into the freezing chamber. The base section has an open upper end for receiving the aerator tube and a longitudinal passage connecting the aerator tube to an open lower end thereby placing the storage hopper in fluid communication with the freezing chamber. The base section also has a check valve located in the upper end of the longitudinal passage such that the check valve is in thermal communication with the liquid in the storage hopper rather than the frozen mix in the freezing chamber.

In accordance with another aspect of the invention, an air/liquid regulator is disclosed in which an aerator tube has an air inlet at a top end and liquid inlet at a lower end and the aerator tube is at least partially divided at the liquid inlet. A base section is engageable with the storage hopper and extends into the freezing chamber. The base section receives the aerator tube in its open upper end and communicates air and liquid to the freezing chamber through its lower end. The base section has a check valve located in its longitudinal passage. The division in the aerator tube in conjunction with a large cross-sectional area of the longitudinal passage in the base section, provides a self priming feature and enables the machine to feed thick, viscous mixes.

The aerator tube is designed with an air inlet and a liquid inlet at each end, wherein the liquid inlets differ in cross-sectional area so that the aerator tube is invertible to allow the same regulator to be used with thick or thin mixes.

The large cross-sectional area of the longitudinal passage in the base section also allows any frozen mix that enters into the bottom of the regulator to be flushed out by incoming liquid, and since the placement of the check valve is located in thermal proximity to the warmer liquid in the storage hopper, rather than the colder liquid in the freezing chamber, the check valve is not likely to freeze up which will ensure a relatively constant product overrun.

The use of a single check valve located above the large cross-sectional passage area, also simplifies the construction and lowers the cost as compared to regulators having a check valve for each of the air and liquid inlets.

A unique removable retainer for the check valve allows easy and thorough cleaning of the entire regulator, thereby encouraging frequent cleaning.

The regulator of the present invention also has an interlocking feature where the regulator twist-locks into the storage hopper to eliminate the potential of self-ejection when the check valve closes and a pressure differential occurs between the storage hopper and the freezing chamber.

Accordingly, one object of the present invention is to provide an air/liquid regulator that is capable of stabilizing the overrun of the mixed dispensed product under conditions that range from long periods of constant use in warm weather, to long periods of stand-by operation during cold weather.

Another object of the invention is to provide an air/liquid regulator which eliminates the formation of foam or froth on top of the liquid in the storage hopper, thereby providing a more sanitary dispensing machine and allowing accurate measurement of the liquid temperature. Another object of the present invention is to provide an air/liquid regulator capable of use with various liquid viscosities.

Yet another object of the present invention is to provide a regulator capable of allowing self-priming of the freezing chamber and avoiding any freeze-up potential.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIG. 1 is a partial sectional view of a frozen dessert dispensing machine incorporating the present invention.

FIG. 2 is an enlarged sectional view of a portion of FIG. 1 showing the regulator of the present invention in cross-section.

FIG. 3 shows a partially sectioned side view of a portion of the regulator of FIG. 1.

FIG. 4 is a cross-sectional view of a portion of FIG. 2 taken along line 4—4 of FIG. 2.

FIG. 5 is a cross-sectional view of a portion of FIG. 2 taken along line 5—5 of FIG. 2.

FIG. 6 is a cross-sectional view of a portion of FIG. 2 taken along line 6—6 of FIG. 2.

FIG. 10 shows a side, cross-sectional view of an alternate embodiment of that shown in FIG. 3.

FIG. 11 is a partial, cross-sectional view of a preferred embodiment of the mixed regulator of FIG. 1.

FIG. 12 is a cross-sectional view taken along line 12—12 of FIG. 11.

FIG. 13 is a perspective view of a portion of FIG. 12.

FIG. 14 is a cross-sectional view taken along line 14—14 of FIG. 12.

FIG. 15 is a cross-sectional view taken along line 15—15 of FIG. 12.

DETAILED DESCRIPTION OF THE PREFERRED EMBODIMENT

Figure 7:
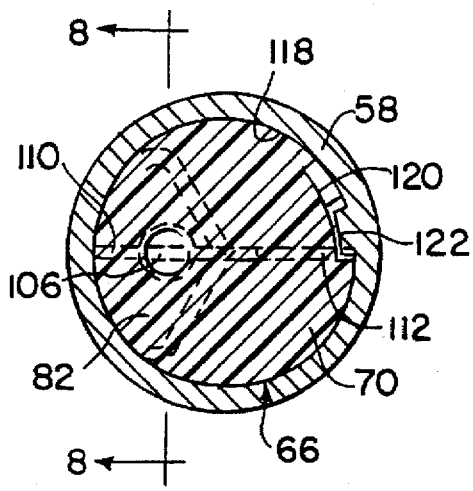
FIG. 7 is a cross-sectional view of a portion of FIG. 2 taken along line 7—7 of FIG. 2.

Referring to FIG. 1, a frozen dessert dispensing machine 10 has a horizontally elongated cylinder 12 enclosing a cylindrical freezing chamber 14 wherein an inner wall 16 is cooled by refrigeration ducts 18. Freezing chamber 14 contains an auger type blender 20 for agitating and aerating a mixture therein. In the preferred embodiment, the blender 20 is driven by drive shaft 22 mounted in an external bearing 24. The elongated cylinder 12 has an end cap 26 having an opening 28 through which the drive shaft 22 extends. Opening 28 is sealed from freezing chamber 14 by a rubber cup seal 27, all as is well known in the art.

A drive disk 29 is mounted to one end of the drive shaft 22 for rotating the blender 20 which includes an auger blade 30 a scraper blade 32 and a stay rod 34 The opposite end of the auger blender 20 has a bearing hub 36 rotatably mounted on a bearing boss 38 extending from a front wall 40 of cylinder 12. A bracket 42 connects the bearing hub 36 with each of the respective ends of the auger blade 30, scraper blade 32, and stay rod 34. In this manner, when the drive shaft 16 is turned by a motor (not shown), each of the auger blade 30, scraper blade 32, and stay rod 34 rotate as a unit in the freezing chamber 14. A blender bar 44 has one end centered in drive shaft 22, and the other end centered in bearing hub 36 and is held stationary by an anchor rod 46 which is seated in a slot 48 of front wall 40. The front wall 40 of the freezing chamber 14 has a dispensing nozzle 50 and a handle 52 attached at its upper end to rotate the dispensing nozzle 50 and dispense frozen dessert from the freezing chamber 14 through channel 54 and out dispenser opening 56.

The frozen dessert machine 10 also has a storage hopper 58 in fluid communication with the freezing chamber 14 for storing consumable liquid 60. The liquid 60 is drawn into the freezing chamber 14 through an inlet bore 62 in end wall 26 having therein a mix regulator 66. Liquid 60 and air 64 enter the freezing chamber 14 by way of the mix regulator 66 having an aerator tube 68 and a base section 70. The liquid and air enter the freezing chamber 14 in a receiving section 72, which is rearward of drive disk 29. Air 64 enters the regulator 66 through an air inlet 74 at a top end of the aerator tube 68, and liquid 60 enters the mix regulator 66 through a liquid inlet 76 at a lower end of aerator tube 68, as will be more thoroughly described later with reference to the remaining drawings.

Referring to FIG. 1, the general operation of the frozen dessert dispensing machine 10 can be understood as follows. The auger type blender 20 rotates and draws liquid and air from hopper 58 into receiving section 72 and then into the main freezing chamber 14 through the peripheral gap between drive disk 29 and inner wall 16 of cylinder 12, and agitates, mixes, and blends the air and liquid to aerate the liquid and at the same time cool the aerated mixer to form a desired serving consistency of the dessert mix. The proportion of air and liquid in the final mix will depend upon the proportion of air and liquid entering the receiving section 72, which in turn depends upon the function of the mix regulator 66 as herein described.

Referring to FIG. 2, the mix regulator 66 is shown in cross-section mounted in storage hopper 58. As previously described, the mix regulator 66 has an aerator tube 68 extending through liquid 60 and above a liquid level 78 to draw air 64 into air inlet 74 through air passage 80 and into a longitudinal passage 82 of base section 70. Storage hopper 58 is fitted into inlet bore 62 and thereby sealed with end wall 26 which partially forms receiving section 72 of freezing chamber 14. In the preferred embodiment, the base section 70 of mix regulator 66 is sealed in storage hopper 58 with a pair of O-rings 84, 86. However, other forms of sealing such as a single O-ring or a cup seal could be alternatively used.

Although only a single liquid inlet is required, the aerator tube 68 has a liquid inlet 76 at each end so that the aerator tube 68 is exchangeably invertible. As is evident in both FIG. 2 and FIG. 3, the cross-sectional area of each of the two liquid inlets 76 differ. This feature allows the introduction of differing liquid viscosities into the regulator with fairly consistent results. For example, inlet bore 88 located in aerator tube end 90 is larger than inlet bore 92 of aerator tube end 94. As a result, an operator may easily extract aerator tube 68 without touching and contaminating liquid 60, clean, invert, and install the aerator tube 68 into base section 70 without removing the entire mix regulator 66. Base section 70 has a taper 96 at an upper end of bore 98 to easily receive the aerator tube 68 even in the presence of liquid 60.

In the case of having a thick liquid 60 in storage hopper 58, such as high fat content dairy products which have high viscosity, the aerator tube 68 is inserted having the larger inlet bore 88 inserted first into the base section 70 to receive liquid therethrough. Conversely, for very low fat, low viscosity liquids, the smaller inlet bore 92 is selected for reception of liquid 60. It is contemplated that the mix regulator 66 can be supplied with a number of aerator tubes 68 to supply the vendor with a variety of dimensional liquid inlets 76 as may be needed. In other words, a dessert machine incorporating the present invention, can dispense product ranging from very low viscosity sherbets and sorbets up to very high viscosity custards by simply replacing the aerator tube 68 with one having a liquid inlet of desired size. At present it is believed that two aerator tubes 68, having a total of four different sized liquid inlet bores would be sufficient to mix, aerate, and properly dispense dessert mixes across the viscosity range of consumable liquids.

As previously mentioned, the base section 70 is removably engageable with the storage hopper 58 and extends into the freezing chamber 14. The base section has an open upper end 100 to receive the aerator tube 68. The open upper end 100 places the aerator tube 68 in fluid communication with longitudinal passage 82, which in turn is in fluid communication with the receiving section 72 of the freezing chamber 14. A check valve 102 is located in the longitudinal passage 82 of the base section 70 in an area, generally referred to with reference character 104, that is thermal communication with the liquid 60 in the storage hopper 58. In this manner, the relatively warmer liquid 60 in the storage hopper 58 prevents the check valve 102 from freezing in position from the colder temperatures from the freezing chamber 14. In the preferred embodiment, check valve 102 has a check ball 106 and a valve seat 108 for seating the check ball and preventing the release of aerated mixture from the freezing chamber 14 back into the storage hopper 58 and creating a froth mixture. As previously explained, such frothing or foaming creates a layer of highly aerated foam or froth on top of the liquid 60 in the storage hopper 58. This is an undesirable effect found in many prior art frozen dessert machines because it not only creates an unsanitary condition when it overflows from the storage hopper, but also prevents the proper measurement of the liquid temperature because the thermometer is placed in the warmer aerated foam, rather than in the cooler non-aerated liquid 60. Further, if the foam reaches above the air inlet in these prior art machines, an improper liquid/air mixture is drawn into the freezing chamber.

When the check valve 102 is in its closed position, check valve 106 is moved to its upper position as shown in shadowed lines as check ball 106'. The check valve 102 can be a number of different variations, some of which are disclosed in U.S. Pat. No. 4,831,839, which is assigned to the assignee of this invention.

The check valve 102 is removable from the mix regulator 66, and specifically from the base section 70, so that it and the longitudinal passage 82 may be easily cleaned on a regular basis. In the embodiment shown in FIG. 2, the check valve 102 is held in place with a removable roll pin 110 inserted into slot 112 having openings on both sides of the base section 70. An alternate removable retainer is disclosed later with reference to FIG. 11–15.

Aerator tube 68 has a divider 114 located within the aerator tube 68 at the liquid inlet 76. The divider provides uninhibited introduction of liquid 60 through liquid inlet 76 and liquid inlet passage 116, while at the same time allowing entry of air through air passage 80. This is especially useful during priming when the freezing chamber 14 is initially empty, and the storage hopper 58 is being filled. The divider allows the introduction of liquid through liquid inlet 76, while at the same time allowing a path for air to escape freezing chamber 14 through air passage 80. In this manner, the frozen dessert machine incorporating the present invention provides the additional feature of self-priming. Additionally, the cross-sectional area of the longitudinal passage 82 in base section 70 is larger than that of the aerator tube 68 which provides a dual path for the introduction of liquid, at the same time allowing an escape passage for the excess air in the freezing chamber 14. Accordingly, it has been found that the large cross-sectional area of the longitudinal passage 82, in combination with the divider 114 at the liquid inlet 76, provides the additional feature of flushing out any frozen mix that may enter the bottom of the regulator 66 and thereby enhancing dispensing performance.

Referring to FIG. 3, aerator tube 68 is shown with a larger inlet bore 88 at aerator tube end 90, and a smaller inlet bore 92 of liquid inlet 76 at aerator tube end 94. The invertible aerator tube 68 has air inlets 74 at both ends to allow air introduction regardless of which end is inserted into the base section 70. FIG. 3 is partially cut away at its center to show divider 114 runs the length of aerator tube 68 in this embodiment.

FIG. 4 shows a sectional view of the aerator tube 68 taken along line 4—4 of FIG. 2. Divider 114 of aerator tube 68 divides air inlet 74 from the liquid inlet 76 of the relatively smaller sized inlet bore 92 for thin liquids of high viscosity.

FIG. 5 is a view of aerator tube 68 taken along line 5—5 of FIG. 2 showing the larger inlet bore 88 of liquid inlet 76 separated from air inlet 74 by divider 114.

FIG. 6 is a view taken along line 6—6 of the lower end of base section 70 showing the large cross-sectional area of longitudinal passage 82 which is provided to not only allow the introduction of liquid during priming, but to allow the escape of air out of freezing chamber 14, as previously described.

FIG. 7 is a view along line 7—7 of FIG. 2 showing the base section 70 of mix regulator 66 removably engaged in storage hopper 58. The enlarged longitudinal passage 82 is shown in shadowed lines, and check ball 106 is shown supported by roll pin 110 within slot 112. FIG. 7 shows an outer diameter 118 of base section 70 engageable with the storage hopper 58 and interlocking therewith. The outer diameter 118 of the base section 70 has an indentation 120 engageable with a detent 122 of the storage hopper 58. Such interlocking is necessary because pressure can build up inside freezing chamber 14 and force the regulator up and out of engagement with the storage hopper 58 if not locked in place.

Figure 8:
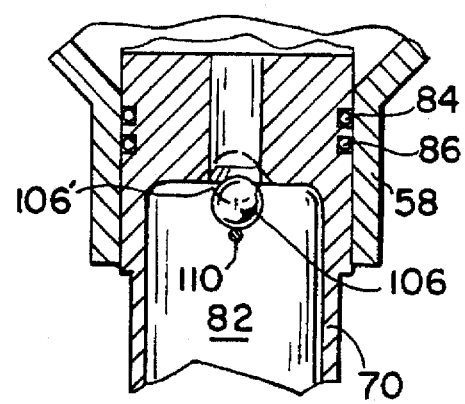
FIG. 8 is a side, sectional view taken along line 8—8 of FIG. 7.

FIG. 8 shows a partial sectional view taken along line 8—8 of FIG. 7 in which base section 70 is engaged with storage hopper 58 and sealed with O-rings 84 and 86. Check ball 106 is in its lower position allowing the entrance of liquid and air into longitudinal passage 82. Check valve 106' shows, in phantom, the check valve in its closed position.

Figure 9:
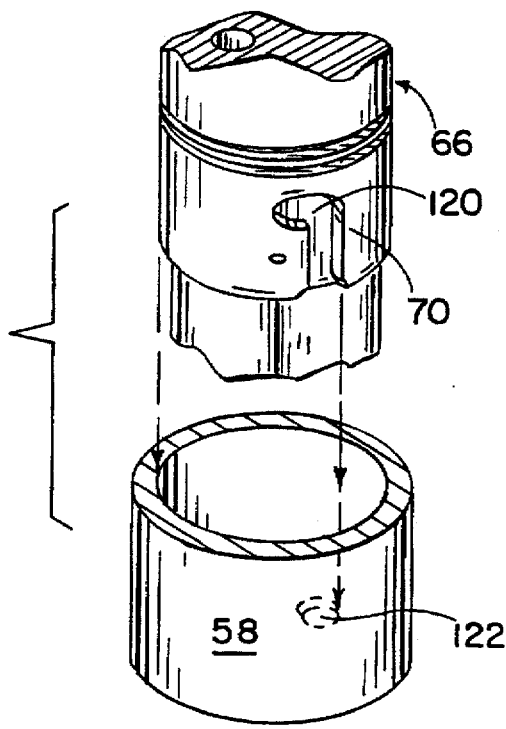
FIG. 9 shows an exploded, perspective view of a portion of FIG. 2.

FIG. 9 is an exploded, perspective view of the interlocking relationship between the base section 70 of mix regulator 66 and the storage hopper 58. As is readily apparent from FIG. 9, slotted indentation 120 is engageable with detent 122 of storage hopper 58 and twist locks into locking position. Alternately, the slotted indentation 120 may extend in the opposite direction as shown in FIG. 9 to allow locking relationship in a clockwise direction and unlocking in a counter-clockwise direction.

FIG. 10 shows an alternate embodiment of the aerator tube 68. As is evident by like numerals with the aerator tube of FIG. 3, the basic construction is similar to that of FIG. 3 with the exception of having a pair of dividers 124 and 126 as opposed to a continuous divider 114 of FIG. 30 It has been found that having a dual divider within aerator tube 68 works as well as having a continuous divider, but provides the additional benefit of less material. It is envisioned that yet another embodiment of the aerator tube would consist of one hollow tube inside of another wherein the inside of the inner tube would provide an air passage, and the passage between the two tubes would provide a liquid passage. The inside tube may be attached to the outside tube by a web at either end, or any other form of attachment.

FIG. 11 shows a preferred embodiment of the mix regulator 66 having a modified base section 128 having a removable retainer 130 in the longitudinal passage 82 to retain the check valve and provide easier access to the check valve. The mix regulator 66 of FIG. 11 shows the aerator tube 68 with the continuous divider 114.

FIG. 12 shows the mix regulator 66 of FIG. 11 in cross-section along line 12—12. Base section 128 has a pair of oppositely aligned holes 132 and 134 to receive corresponding nipples 136 and 138 from each leg of retainer 130.

FIG. 13 shows a perspective view of retainer 130. Retainer 130 has a pair of finger grip protrusions 140 and 142 extending outwardly from the lower end of each leg 144 and 146 to allow the lower end of each leg to be compressed, as shown in shadowed lines in FIG. 12, to disengage nipples 136 and 138 from holes 132 and 134 of the base section 128. In this matter, the retainer 130 may be withdrawn from the longitudinal passage 82 to remove check ball 106 and allow cleaning of the check ball and the interior of the mix regulator 66. The upper portion 148 of retainer 130 is slightly V-shaped to keep the check ball 106 in the correct position as shown in FIG. 13 and 14. Further, the slight V-shape in upper portion 148 provides an outward biasing on legs 144 and 146 for easy re-engagement of nipples 136 and 138 into holes 132 and 134 of base section 128.

FIG. 15 shows a view along line 15—15 of FIG. 12. The retainer clip 130 is shown with legs 144 and 146 in close proximity to the inner side wall of longitudinal passage 82. The thin wire design of retainer clip 130 allows unobstructed passage of air and liquid through the longitudinal passage 82.

The present invention has been thoroughly described herein as applied in one particular dispensing machine. However, it is understood that the invention is well suited for use in any of the various types of equivalent dispensing machine configurations and is not limited to the application described herein and shown in the drawings.

The present invention has been described in terms of the preferred embodiment, and it is recognized that equivalents, alternatives, and modifications, aside from those expressly stated, are possible and within the scope of the appending claims.

What is claimed is:

1. An air/liquid regulator for use between a liquid storage hopper and a freezing chamber wherein liquid from the storage hopper is aerated and chilled in the freezing chamber, the regulator comprising:

an aerator tube having an air inlet at a top end and a liquid inlet at a lower end;

a base section removably engageable with the storage hopper and extending into the freezing chamber, the base section having an open upper end to receive the aerator tube and a longitudinal passage connecting the open upper end with an open lower end thereby placing the storage hopper in fluid communication with the freezing chamber; and a check valve located in the longitudinal passage of the base section in an area of the base section that is in thermal communication with liquid in the storage hopper.

2. The regulator of claim 1 wherein the aerator tube is invertible having an air inlet and a liquid inlet at each end.

3. The regulator of claim 2 wherein one liquid inlet has a cross-sectional area larger than the other, each for use with differing liquid viscosities.

4. The regulator of claim 1 wherein the check valve comprises a check ball and valve seat.

5. The regulator of claim 1 further comprising removable check valve.

6. The regulator of claim 5 further comprising a retainer in the open lower end of the base section to retain the check valve, wherein the retainer and the check valve are removable for cleaning.

7. The regulator of claim 1 wherein the aerator tube further comprises a divider at the liquid inlet.

8. The regulator of claim 7 wherein the cross-sectional area of the longitudinal passage in the base section is larger than that of the aerator tube, and the combination of the larger cross-sectional area of the longitudinal passage and the divider at the liquid inlet provide self-priming of the freezing chamber.

9. The regulator of claim 1 wherein the aerator tube is an integral member of the base section.

10. The regulator of claim 1 wherein the base section has an outer diameter engageable with the storage hopper and interlocking therewith.

11. The regulator of claim 10 wherein the base section has an indentation in the outer diameter and the storage hopper has a detent engageable with the indentation to lock the regulator to the storage hopper.

12. An air/liquid mix regulator for use between a liquid storage hopper and a freezing chamber wherein liquid from the storage hopper is aerated and chilled in the freezing chamber, the regulator comprising:

an aerator tube having an air inlet at a top end and a liquid inlet at a lower end, the aerator tube being at least partially divided at the liquid inlet;

a base section removably engageable with the storage hopper and extending into the freezing chamber, the base section having an open upper end to receive the aerator tube and a longitudinal passage connecting the open upper end with an open lower end thereby placing the storage hopper in fluid communication with the freezing chamber; and a check valve located in the longitudinal passage of the base section.

13. The regulator of claim 12 wherein the check valve is located in an area of the base section that is in thermal communication with liquid in the storage hopper.

14. The regulator of claim 12 wherein the aerator tube is invertible having an air inlet and a liquid inlet at each end.

15. The regulator of claim 14 wherein one liquid inlet has a cross-sectional area larger than the other, each for use with differing liquid viscosities.

16. The regulator of claim 12 wherein the check valve comprises a check ball and valve seat.

17. The regulator of claim 12 further comprising removable check valve.

18. The regulator of claim 17 further comprising a retainer in the open lower end of the base section to retain the check valve, wherein the retainer and the check valve are removable for cleaning.

19. The regulator of claim 12 wherein the aerator tube is at least partially divided at the air inlet and at the liquid inlet.

20. The regulator of claim 12 wherein the cross-sectional area of the longitudinal passage in the base section is larger than that of the aerator tube.

21. The regulator of claim 12 wherein the aerator tube is an integral member of the base section.

22. The regulator of claim 12 wherein the base section has an outer diameter engageable with the storage hopper and interlocking therewith.

23. The regulator of claim 22 wherein the base section has an indentation in the outer diameter and the storage hopper has a detent engageable with the indentation to lock the regulator to the storage hopper.

24. A frozen dessert machine comprising:

a hopper for storing a liquid;

a freezing chamber connected to the hopper for receiving, cooling, and mixing the liquid from the hopper with air to form an aerated mixture;

a regulator for introducing and regulating the introduction of liquid and air into the freezing chamber, the regulator having separate passages for the introduction of air and liquid wherein an air passage is in communication with air and a liquid passage is in communication with the liquid in the hopper, the regulator also having a check valve for preventing the backflow of aerated mixture from the freezing chamber into the hopper, the check valve located in a check valve passage of the regulator joining the air passage and the liquid passage to form an enlarged flow passage in communication with the freezing chamber.

25. The frozen dessert machine of claim 24 wherein the separate air and liquid passages are separated by at least one divider at an air orifice and at a liquid orifice for providing self-priming of the freezer chamber.

26. The frozen dessert machine of claim 24 wherein the check valve in the check valve passage is located in thermal communication with the liquid in the hopper for preventing freeze-up of the check valve.

27. The frozen dessert machine of claim 24 wherein the combination of the enlarged flow passage and the separate passages for the introduction of air and liquid provide self-priming of the freezing chamber when filling the hopper with the liquid.

* * * * *